United States Patent [19]

Kerr

[11] 4,325,143

[45] Apr. 13, 1982

[54] MICROPHONE HOLDER ATTACHMENT AND SWITCH CONTROL THEREFOR

[76] Inventor: Leslie I. Kerr, 16 Polk Rd., Hingham, Mass. 02043

[21] Appl. No.: 178,695

[22] Filed: Aug. 18, 1980

[51] Int. Cl.$^3$ .............................................. H04B 1/38

[52] U.S. Cl. ........................................ 455/89; 455/99; 455/345; 179/1 VE; 179/148 F; 200/153 C; 74/512

[58] Field of Search ........................ 455/89, 90, 95, 99, 455/345, 351; 200/153 C, 331; 74/512, 513; 179/1 VE, 1 SW, 148 F

[56] References Cited

U.S. PATENT DOCUMENTS

| | | | |
|---|---|---|---|
| 1,478,701 | 12/1923 | Diehl | 200/153 C |
| 2,384,805 | 9/1945 | Arens | 74/512 |
| 3,468,187 | 9/1969 | Payerle | 74/512 |
| 4,060,697 | 11/1977 | Neal | 179/1 VE |
| 4,151,468 | 4/1979 | Kerr | 455/89 |

*Primary Examiner*—Jin F. Ng

*Attorney, Agent, or Firm*—Munroe H. Hamilton

[57] ABSTRACT

A Citizens Band transceiver mounted on the instrument panel of a motor vehicle has attached thereto bracket structure which includes a rearwardly extending arm engageable upon the vehicle seat. The rearwardly extending arm has supported therethrough a flexible tubular body which supports at an upper end thereof a microphone holder and a microphone detachably received therein and electrically connected to the transceiver. Elongated switch actuating means slideably disposed in the tubular body is provided with an actuator button received in the microphone holder frame and positioned to operate an externally located switch on the microphone.

An opposite end of the elongated switch actuating means is secured to the vehicle floor with an extension part of the switch actuating means properly contained therein. A hinging foot pedal device is operatively connected to the projecting extremity of the switch actuating means. The arrangement of parts enables the driver of the vehicle to maintain both hands on the steering wheel of the vehicle when speaking into the microphone and thus avoids violation of traffic regulations prohibiting the use of one hand to hold the microphone while driving with only one hand.

2 Claims, 6 Drawing Figures

MICROPHONE HOLDER ATTACHMENT AND SWITCH CONTROL THEREFOR

BACKGROUND OF THE INVENTION

Citizens Band transmitting and receiving units, commonly referred to as transceivers, are presently being installed in motor vehicles in increasing volume, and it is customary for the driver of the vehicle to drive a moving vehicle with one hand on the wheel while the other hand is used to hold a microphone as messages are being transmitted by the driver. It is understood that there has been objection to this practice when continuously carried out by some traffic officers as it is claimed that in the event of a sudden traffic emergency, failure to have both hands available for driving may lead to difficulty.

Various proposals have been made for mounting Citizens Band units in vehicles and it is wellknown in the art to provide remote control devices for radio receiving apparatus as well as portable units to be carried by an operator. Proposals of this nature are, for example, noted in U.S. Pat. Nos. 1,926,256, 2,520,732, 2,436,177, 3,745,462 and 3,914,629.

More recently there has been disclosed in U.S. Pat. No. 4,151,468, issued to the applicant of the present application, an arrangement for supporting a microphone in front of a driver utilizing bracket means attachable to the top of the backrest of a vehicle seat and further provided with a sliding foot pedal device for moving an actuator button against the microphone switch while supported in front of the driver. The backrest bracket means has been found to be lacking in stability and movement of the driver's foot in a linear path of travel is lacking in practicality.

SUMMARY OF THE INVENTION

The present invention relates to apparatus for operating a Citizens Band transceiver and microphone assembly in a motor vehicle without requiring use of the hands of the vehicle driver. The apparatus includes bracket means attachable to the transceiver, a microphone frame, tubular means for supporting the frame in a speaking mode in front of the driver and a foot pedal device for operating an externally located switch on the microphone. The bracket means includes a rearwardly extending arm which is designed to provide desirable stability of the tubular supporting means. The foot pedal device further includes hinging means which requires no linear displacement of the driver's foot.

DETAILED DESCRIPTION OF THE INVENTION

Figure 1:
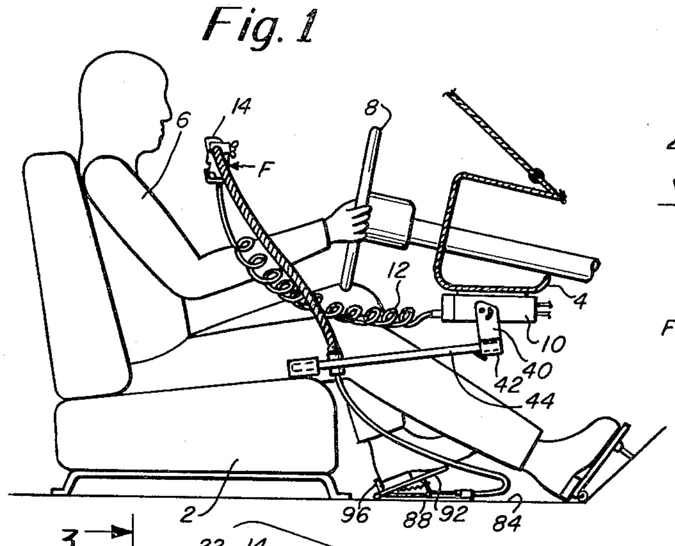
FIG. 1 is a side elevational view illustrating diagrammatically a motor vehicle seat and the driver thereon with a Citizens Band transceiver mounted in the vehicle and a microphone component supported in an operating position by means of the invention apparatus.

Referring in detail to the drawings, FIG. 1 illustrates diagrammatically a seat 2 which may, for example, be a seat of a motor vehicle. A panel portion of the vehicle is fragmentarily indicated in FIG. 1 and denoted by numeral 4. Numeral 6 indicates diagrammatically a motor vehicle driver sitting in a typical driving position on the seat 2 so that a steering wheel 8 may be grasped by both hands of the driver when desired.

A Citizens Band transceiver of conventional nature is denoted by the numeral 10 and may be mounted in any convention point on the vehicle body, for example, at the underside of the front panel 4. The transceiver unit 10 includes a microphone 14 which is normally mounted on the transceiver body 10 by means of a standard clip arrangement, but is shown removed from the transceiver in the drawing. The microphone is electrically connected to the transceiver by electrical conductor means 12.

Figure 3:
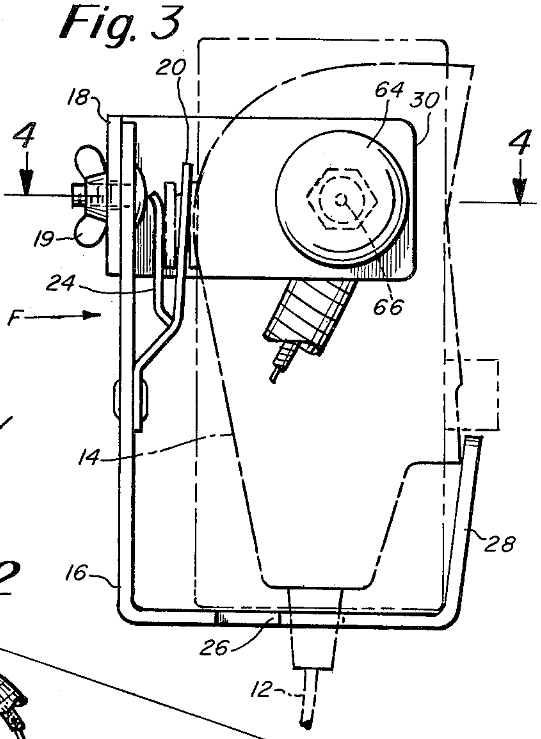
FIG. 3 is an elevational view taken approximately along the line 3—3 of FIG. 2.

In accordance with the invention, there is provided apparatus for mechanically supporting the microphone in a position in front of the vehicle driver in a speaking mode as has been suggested in FIG. 1. An important component of the apparatus is a microphone holder frame genrally denoted by the arrow F. As is more clearly shown in FIGS. 2–3, inclusive, the holder frame F is comprised by a U-shaped frame part 16 which is normally designed to be located in a vertically disposed position as suggested in FIG. 3. A second frame part 18 is adjustably secured at an upper end of the frame part 16 by means such as a wing nut 19 and is normally located in a horizontally extending position as is shown in FIG. 3.

It will be noted that more recent forms of C.B. transceivers have been constructed with means for self containing the microphone and the change in size for this type of microphone arrangement has been taken care of by the enlarged U-shaped frame part 16 so that greater versatility is achieved.

Secured to an inner side of the U-shaped frame part 16 by suitable fastening means is a clip device having spaced apart upright fingers 20 and 22 and an offset spring tongue 24 arranged in spaced relation between the fingers 20 and 22. This clip arrangement is intended to be engageable with the back of conventional microphones used in Citizen Band transceivers in the usual manner to thus detachably secure the microphone in the frame in a firmly held manner.

At the lower extremity of the frame 16, there is formed a cord retaining slot 26 in which the electrical conductor 12 may be releasably contained. FIG. 3 illustrates the microphone 14 mounted in the frame as described with the conductor means extending downwardly through the cord retaining slot 26 and with a lower edge of the microphone 14 being snugly received against an upright extension 28 of the frame 16.

Figure 4:
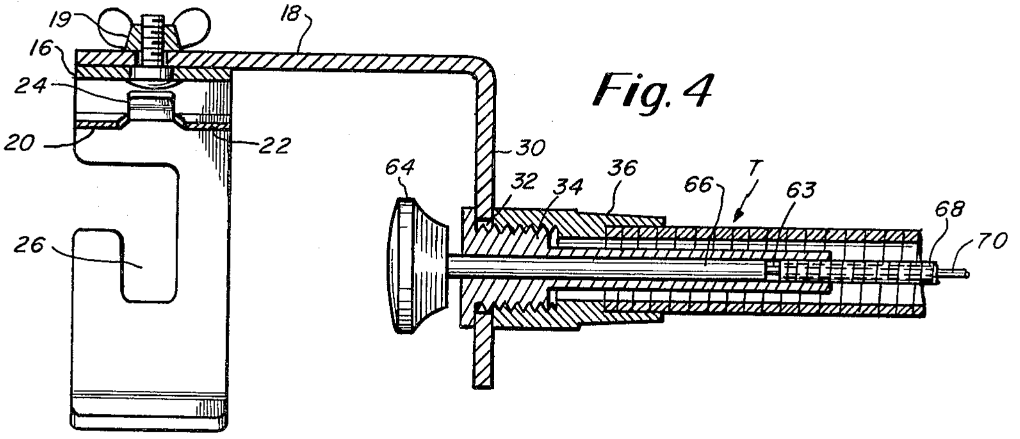
FIG. 4 is a cross-sectional view taken on the line 4—4 of FIG. 3.

The second horizontally disposed frame part 18 is, as shown in FIGS. 3 and 4, formed with an angularly disposed part 30. Support means for locating the microphone holder frame in the speaking mode earlier disclosed is solidly secured to the angular extension 30. As one suitable form of support means, there is provided a tubular body T which may, for example, consist of a spirally wound metal capable of providing a substantial degree of rigidity and yet being sufficiently flexible to be turned into any desired position of adjustment. One desirable means of attaching the tubular body T to extension part 30 may include cylindrical adapter 34 having a threaded outer portion received through a hole 32 in the extension part 30. In threaded engagement with the 34 is a cylindrical locking sleeve 36 within which is tightly fitted one end of the tubular body T as is most clearly shown in FIG. 4.

Figure 5:
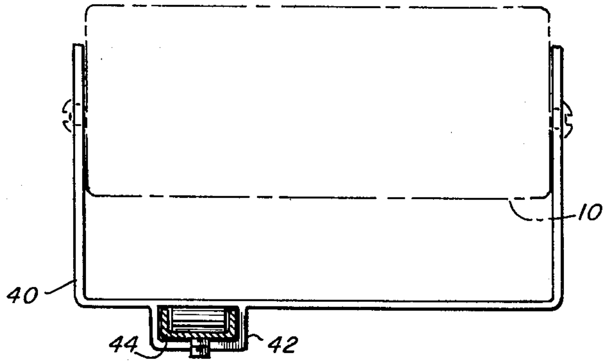
FIG. 5 is a cross-sectional view taken on the line 5—5 of FIG. 2.
Figure 6:
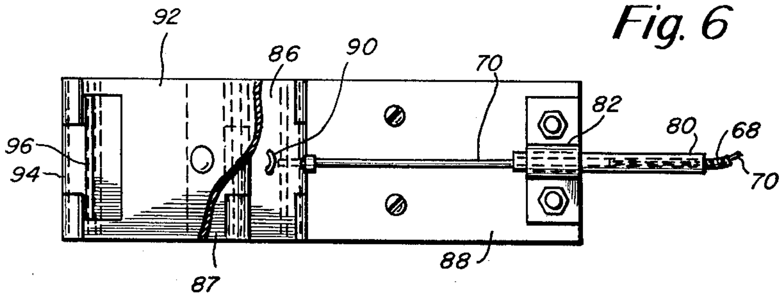
FIG. 6 is a detail plan view of the foot pedal device and actuating means of the invention.

At its opposite end the tubular body T is firmly anchored by a bracket and rearwardly extending arm through which the member T extends, as shown in FIG. 1. Numeral 40 denotes the bracket component attached to the transceiver 10, which is also shown in FIG. 1. As is more clearly shown in FIG. 5, the bracket is formed at its underside with a channel part 42 in which is solidly secured one end of the arm 44 and the arrangement of parts is such that an opposite end of the arm 44 engages over the vehicle seat and is supported by the seat at one side of the operator 6, as shown in FIG. 1.

It will be seen that the tubular member T can, when employed in an upright manner shown, be conveniently adjusted to support the microphone frame as desired in a conventional speaking mode in front of the driver.

Further combined with the microphone frame described is means for actuating the control switch of the microphone. This control switch is of conventional form and is indicated diagrammatically together with the electrical contacts in FIG. 2 in broken lines. Numeral 56 denotes an external switch element which can be moved inwardly to close the electrical contacts 58 and 60 which places the microphone in an operative position.

Figure 2:
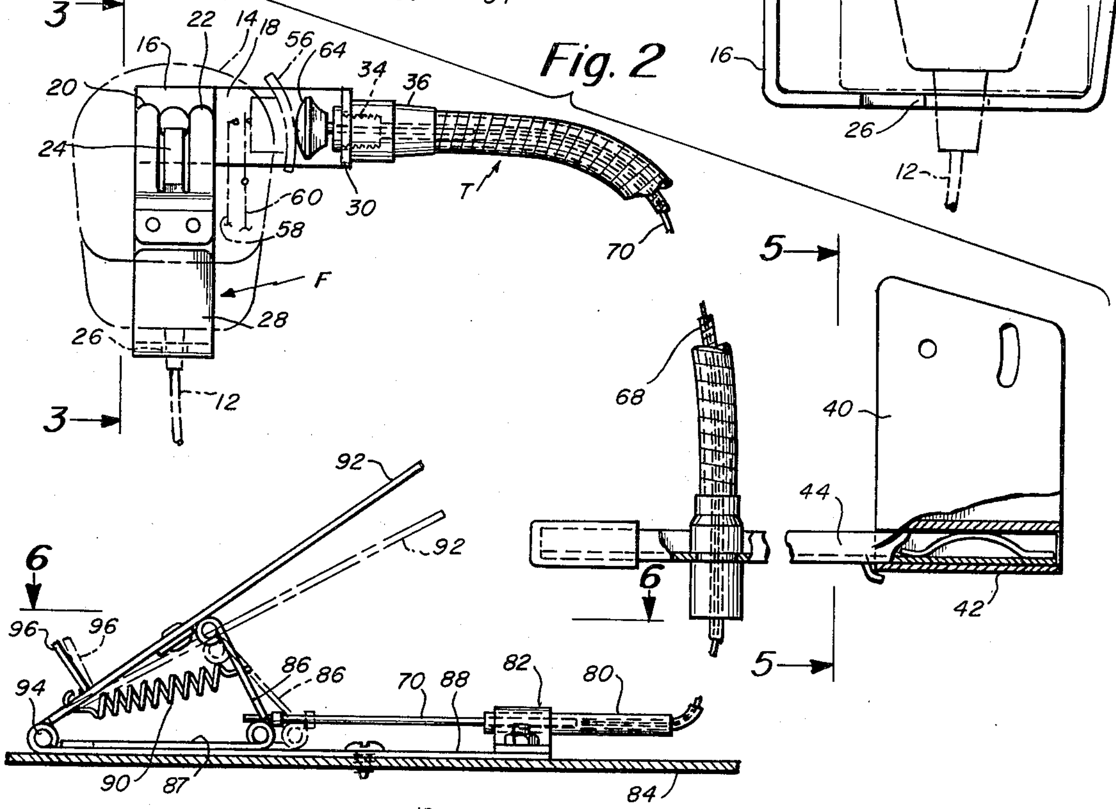
FIG. 2 is another side elevational view showing the components of the invention apparatus on a larger scale and removed from the motor vehicle.

The switch actuating means includes an actuator knob 64 which, as shown in FIG. 2, is mounted through the frame part 30 in a position closely adjacent to the switch element 56.

Forming an extension of knob 64 is a spindle part 66 (FIG. 4) which extends through the threaded holder 34 and is connected at 63 with one end of an actuator element 70. Member 70 is slideably received through a flexible tubing 68 which is in turn located through a sleeve member 80. Sleeve member 80 is held in a clamp 82 with is in turn secured to a base plate 88 forming a part of the hinging foot pedal mechanism of the invention. The base plate 88 is fastened to floor 84, as shown in FIG. 2.

Included in this hinging foot pedal mechanism is a foot pedal member 92 which is pivotally attached to the base plate 88 at 94. Mounted on the upper side of foot pedal 92 is a heel rest 96. At the under side of the foot pedal 92 is pivotally secured a hinge part 86 which is hinged to a second hinge part 87 slideably displaceable on the base plate 88, in response to downward pressure exerted on the foot pedal 92.

The hinge parts 86 and 87 are normally held in the full line position shown in FIG. 2 by means of a spring 90 attached as shown to an intermediate portion of the hinge part 86 anchored in the under side of the foot pedal 92. These hinge parts are shown in an advanced dotted line position in FIG. 2 to move the member 70 through the tubing 68 when foot pressure is applied. It is pointed out that a simple rocking movement of an operator's toe controls the switch operation with the heel of the foot held in a relatively unchanged position.

I claim:

1. In a motor vehicle having a Citizens Band transceiver, a microphone connected to the transceiver and a control switch located externally of the microphone, a driver operated apparatus for actuating the said control switch, said apparatus characterized by a U-shaped bracket attachable to the transceiver member, said bracket being formed with a channelled portion and having a rearwardly extending arm secured in the channelled portion, an opposite end of the rearwardly extending arm being engageable with the seat of the said motor vehicle, a microphone holder frame for receiving the microphone therein, flexible tubular support means for the holder frame, said support means being located through the said arm and extending upwardly, an upper end of the support means secured in one side of the holder frame to position the holder frame and microphone in a speaking mode for a driver of the said motor vehicle, elongated switch actuating means slideably disposed through the flexible support means, said switch actuating means presenting at one extremity a switch button moveable into contact with the microphone control switch, a hinging foot pedal mechanism connected to the lower extremity of the switch acutating means and responsibe to foot pressure of a driver of the vehicle to advance and retract the actuator button, said hinging foot pedal mechanism including a base plate fastened to the floor of the vehicle, a foot pedal element pivotally attached to the base plate, a hinge part pivotally secured to an under side of the foot pedal and having a lower extremity of the switch actuating means fixed therein, a displaceable hinge part hinged to the said pivotally secured hinge part and slideable on the base plate, and spring means for resliently holding the said pivotally secured hinge part in a retracted position.

2. In a motor vehicle having a Citizens Band transceiver, a microphone connected to the transceiver and a control switch located externally of the microphone, a driver operated apparatus for actuating the said control switch, said apparatus characterized by a U-shaped bracket attachable to the transceiver member, said bracket being formed with a channelled portion and having a rearwardly extending arm secured in the channelled portion, an opposite end of the rearwardly extending arm being engageable with the seat of the said motor vehicle, a microphone holder frame for receiving the microphone therein, flexible tubular support means for the holder frame, said support means being located through the said arm and extending upwardly, an upper end of the support means secured in one side of the holder frame to position the holder frame and microphone in a speaking mode for a driver of the said motor vehicle, elongated switch actuating means slideably disposed through the flexible support means, said switch actuating means presenting at one extremity a switch button moveable into contact with the microphone control switch, a hinging foot pedal mechanism connected to the lower extremity of the switch actuating means and responsible to foot pressure of a driver of the vehicle to advance and retract the actuator button, said hinging foot pedal mechanism including a base plate fastened to the floor of the vehicle, a foot pedal element pivotally attached to the base plate, a hinge part pivotally secured to an under side of the foot pedal and having a lower extremity of the switch actuating means fixed therein, a displaceable hinge part hinged to the said pivotally secured hinge part and slideable on the base plate, and spring means for resiliently holding the said pivotally secured hinge part in a retracted position, and said foot pedal element including a heel rest at a lower end thereof.

* * * * *